(12) United States Patent
Mozer

(10) Patent No.: US 8,204,238 B2
(45) Date of Patent: Jun. 19, 2012

(54) SYSTEMS AND METHODS OF SONIC COMMUNICATION

(75) Inventor: Forrest S. Mozer, Berkeley, CA (US)

(73) Assignee: Sensory, Inc, Santa Clara, CA (US)

( * ) Notice: Subject to any disclaimer, the term of this patent is extended or adjusted under 35 U.S.C. 154(b) by 1045 days.

(21) Appl. No.: 12/135,984

(22) Filed: Jun. 9, 2008

(65) Prior Publication Data

US 2008/0304360 A1 Dec. 11, 2008

Related U.S. Application Data

(60) Provisional application No. 60/933,746, filed on Jun. 8, 2007.

(51) Int. Cl.
*H04R 29/00* (2006.01)

(52) U.S. Cl. ........ 381/58; 381/56; 381/59; 381/77; 381/79; 340/384.4; 340/384.5; 340/384.7; 340/384.71

(58) Field of Classification Search ........ 381/77–79, 381/60, 56–58, 91, 122, 111, 113; 340/573.1, 340/539.26, 539.23, 539.13, 384.7, 384.71, 340/384.5, 384.4
See application file for complete search history.

(56) References Cited

U.S. PATENT DOCUMENTS

| 7,251,339 | B2 * | 7/2007 | Ryan | 381/315 |
| 7,260,221 | B1 * | 8/2007 | Atsmon | 380/247 |
| 7,693,288 | B2 * | 4/2010 | Mergler | 381/58 |
| 7,693,293 | B2 * | 4/2010 | Nemoto et al. | 381/94.5 |
| 7,706,548 | B2 * | 4/2010 | Kanevsky et al. | 381/77 |
| 2004/0264713 | A1 * | 12/2004 | Grzesek | 381/101 |

* cited by examiner

*Primary Examiner* — Goins Davetta
*Assistant Examiner* — Disler Paul
(74) *Attorney, Agent, or Firm* — Fountainhead Law Group PC

(57) ABSTRACT

In one embodiment the present invention includes a method of wireless communication. The method comprises receiving a sonic signal and determining a sequence of sonic tones from a received sonic signal. The receiving includes receiving the sonic signal at an electronic device using a microphone. The sonic signal includes a sequence of sonic tones. The receiving results in the received sonic signal. The sequence of sonic tones contains predefined timing. The timing includes the duration of each sonic tone and a set of intervals between successive sonic tones.

20 Claims, 10 Drawing Sheets

SYSTEMS AND METHODS OF SONIC COMMUNICATION

CROSS REFERENCE TO RELATED APPLICATIONS

The present application claims priority to U.S. Provisional Application No. 60/933,746 titled "Communication between two or more objects using audible frequency tones", filed Jun. 8, 2007.

BACKGROUND

The present invention relates to wireless communication, and in particular, to systems and methods of sonic communication.

Unless otherwise indicated herein, the approaches described in this section are not prior art to the claims in this application and are not admitted to be prior art by inclusion in this section.

Wireless communication allows a user to be un-tethered to a location. Some devices utilize wireless communication to connect to the internet or other network. Some devices utilize wireless communication to communicate with their computer or other electronic device. For example, a wireless keyboard or joystick allows a user to input commands or instructions to a program running on a computer without having a physical connection to the computer. The user can move about or change locations without concern about cabling.

Many input devices such as wireless joysticks, mice, and keyboards utilize Bluetooth electronics to communicate wirelessly. Bluetooth electronics transmit electromagnetic waves and relies upon the computer and the wireless device having the necessary electronics to accomplish the communication. Most input devices require a very low data rate and much of the capability for the Bluetooth electronics is not utilized. The protocol for Bluetooth electronics and other wireless technologies (e.g. Wi-Fi) are costly and may utilize excess battery power. The required hardware and the power consumption may limit the number of possible applications which may benefit from wireless communications.

Thus, there is a need for improved wireless communication. The present invention solves these and other problems by providing systems and methods of sonic communication.

SUMMARY

Embodiments of the present invention improve systems and methods of sonic communication. In one embodiment the present invention includes a method of wireless communication. The method comprises receiving a sonic signal and determining a sequence of sonic tones from the received sonic signal. The receiver of the sonic signal at an electronic device uses a microphone. The sonic signal includes a sequence of sonic tones. The receiving results in a received sonic signal. The sequence of sonic tones contains predefined timing. The timing includes the duration of each sonic tone and a set of intervals between successive sonic tones.

In one embodiment, the invention further comprises filtering the received sonic signal according to a set of frequency bands. The frequency bands correspond to the sonic tones of the sequence of sonic tones. The filtering results in a plurality of tone signals corresponding to the sonic tones.

In one embodiment, the invention further comprises synchronizing the tone signals corresponding to the sonic signal. The synchronizing utilizes a synchronizing signal embedded within the sequence of sonic tones.

In one embodiment, the synchronizing signal is one of the tone signals.

In one embodiment, the invention further comprises integrating the tone signals.

In one embodiment, the invention further comprises removing noise elements from at least one tone signal by using silent intervals in the sequence of sonic tones.

In one embodiment, the determining includes the use of probability sets. The probability sets include sums corresponding to allowed tone combinations.

In one embodiment, the synchronizing signal synchronizes a transmission having the synchronizing signal. The receiving utilizes a pipeline of data which is utilized after the synchronization signal has been detected.

In one embodiment, the allowed tone combinations do not include identical adjacent tones in the sequence of sonic tones.

In one embodiment, the determining includes disqualifying combinations having a tone signal with a power less than a threshold.

In one embodiment, the present invention includes a method of wireless communication. The method comprises encoding digital information and transmitting sonic signals. The encoding includes encoding digital information corresponding to a command into a sequence of sonic tones. The transmitting includes transmitting a cadence of sonic signals corresponding to the sequence of sonic tones from a speaker. The speaker is coupled to a first electronic device.

In one embodiment, no more than a single sonic tone is transmitted at any time.

In one embodiment, the method further comprises embedding synchronization signals within the sequence of sonic tones.

In one embodiment, the transmitting includes transmitting the sequence of sonic tones in timed intervals.

In one embodiment, the method further comprises embedding silent portions within the sequence of sonic tones.

In one embodiment, the transmitting of the sequence of sonic tones utilizes a cadence of sonic signals carries redundant information.

In one embodiment, the sequence of sonic tones does not include adjacent tones having the same frequencies.

In one embodiment, each sonic tone of the sequence of sonic tones has a frequency from 7 kHz to 10 kHz.

In one embodiment, the sequence of sonic tones are embedded into speech, music, and other audible sounds.

In one embodiment, the method further comprises receiving the sonic signal, synchronizing a received signal corresponding to the sonic signal, and determining a sequence of frequencies. The receiving includes receiving the sonic signal at a microphone coupled to a second electronic device. The synchronizing includes synchronizing the sonic signal using the synchronization signals. The sequence of frequencies corresponds to the sequence of sonic tones. The silent portions, the cadence of sonic signals, the redundant information, the timed intervals, and the synchronizing are utilized to extract information corresponding to the command.

In one embodiment, the present invention includes a tangible recording medium having recorded data configured to control a playback device and a toy. The data comprises entertainment data and auditory data. The entertainment data defines an entertainment program displayed by the playback device. The auditory data output is in a range of 7 kHz to 10 kHz. The auditory output controls the toy. The auditory data is related to the entertainment data such that the toy is controlled in correspondence with the entertainment program.

DETAILED DESCRIPTION

Described herein are techniques for systems and methods of sonic communication. The term "sonic" refers to sound signals, which may be at frequencies below about 20 kHz. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
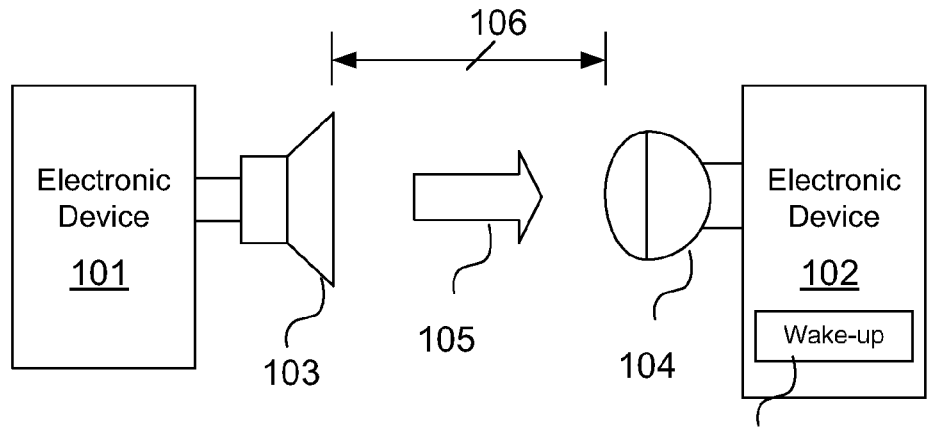
FIG. 1A illustrates a one-way wireless communication system according to one embodiment of the present invention.

FIG. 1A illustrates a one-way wireless communication system 100 according to one embodiment of the present invention. System 100 includes electronic device 101, electronic device 102, speaker 103, and microphone 104. Electronic device 101 is coupled to provide an electrical signal to the speaker 103. Speaker 103 converts the electrical signal into a sonic signal 105 which travels through the air to microphone 104. Microphone 104 converts the sonic signal into an electrical signal with the help of electronic device 102.

Speaker 103 may not be in the line of site of the microphone 104. The energy and direction of sonic signal 105 may depend on the construction of speaker 103. The strength of sonic signal 105 received at electronic device 102 may be related to the strength of the sonic signal 105. The stronger the sonic signal 105 the greater the distance 106 between microphone 104 and speaker 103 may be. The ability for the microphone 104 to sense the sonic signal 105 from different orientations may depend on the construction and type of microphone and the gain circuitry implemented within the electronic device 102.

Electronic device 102 may include a wake-up circuit 107. This wake-up circuit 107 may utilize very little power in order to extend time between charging of a battery which may be used to power electronic device 102. Wake-up circuit 107 may respond to a particular frequency of sonic signal 105. Electronic device 101 may send a wake-up signal in order to turn on the full capability of electronic device 102. Another sonic signal or sequence of sonic tones may be sent to put electronic device 102 back into a low power state.

Electronic device 101 may be a television or a computer equipped with speakers, for example. The user may have an electronic device 102, such as a toy bear, for example. A children's television program may have a sonic signal 105 embedded within the audio being spoken by a character on the television. The toy may have a set of responses such as "Hi Jack", "Hi Jill", "yes", "no", "that's a great idea", "where shall we go?", "be careful", etc., and the television program may send sonic signals with commands which instruct the toy bear to respond to the character on the television program. A character Jack on the television may enter a room and the toy bear may be instructed to face the speaker and say "Hi Jack". The character on the program may have a timed response such as "Hello Bear. Are you ready for an adventure?" and the television program may instruct the bear to say "yes", "where shall we go?"

Figure 1B:
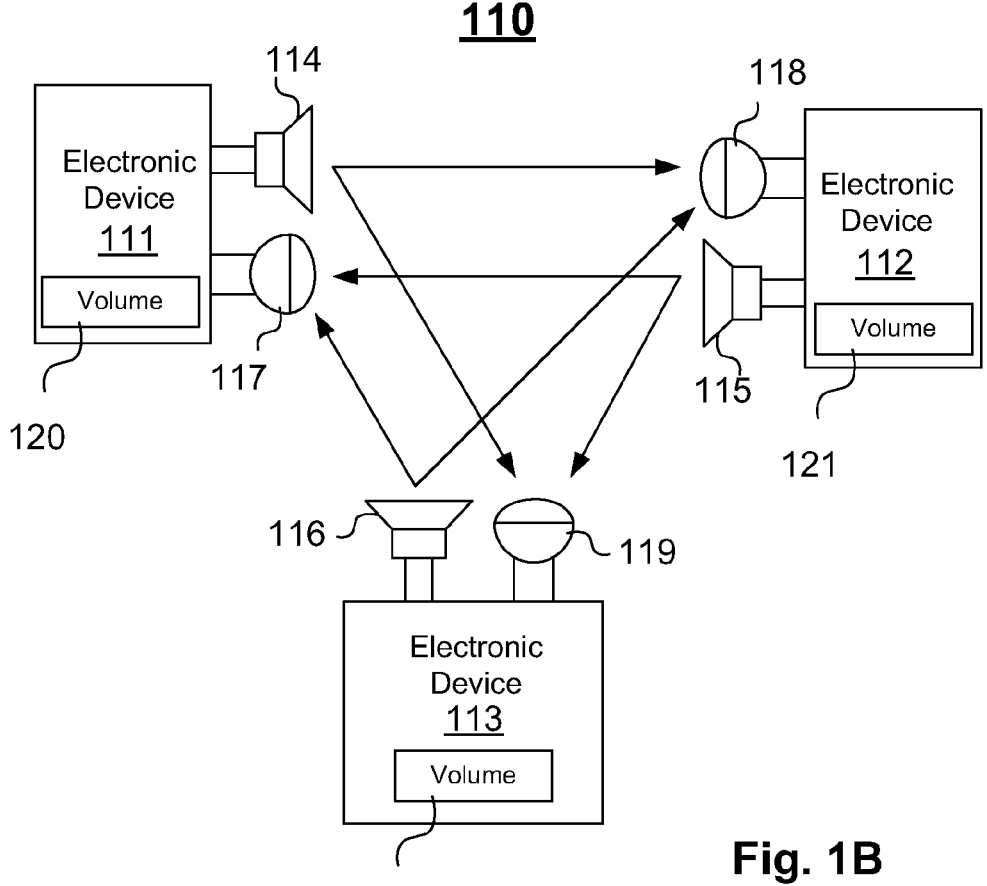
FIG. 1B illustrates a multiple device wireless network according to one embodiment of the present invention.

FIG. 1B illustrates a multiple device wireless network 110 according to one embodiment of the present invention. Network 110 includes electronic device 111-113, speaker 114-116, and microphone 117-119. Speaker 114 and microphone 117 are coupled to electronic device 111. Speaker 115 and microphone 118 are coupled to electronic device 112. Speaker 116 and microphone 119 are coupled to electronic device 113.

Electronic device 111-113 have both a speaker and a microphone. Therefore, each electronic device may communicate bi-directionally over the air wirelessly using sonic signals. Speaker 114 may produce a sonic signal that reaches microphone 118 as well as microphone 119. Electronic device 112 and 113 may respond to the sonic signal by sending their own sonic signals from speaker 115 and 116 respectively.

The wireless network 110 may allow the electronic devices 111-113 to interact and respond to requests from each other. For example, electronic device 111 may be a computer equipped with a microphone 117 and at least one speaker 114. Electronic device 112-113 may be game interface devices. A computer game program may be running on the computer (i.e. electronic device 111). The game program may be like a game show which presents multiple choice questions. Electronic device 112 and 113 may be game controllers which have a group of buttons corresponding to the multiple choice questions (i.e. A, B, C, D, E). The computer program may ask the question and present the choices. One user with electronic device 112 may chose option "A" and another user with electronic device 113 may chose option "B". These responses would be communicated to electronic device 111 (i.e. the computer) using sonic signals. Microphone 117 would translate the sonic signal into an electrical signal with the help of the electronic device 111 and determine the responses. The computer program may announce the correct response or display the correct response on the computer screen. The computer program may also instruct the computer to send a sonic signal to the electronic devices 112-113 indicating the correct answer by lighting up button "B" on the game controllers. Electronic device 113 which transmitted the correct response may have the light on the button blinking and electronic device 112 which transmitted the incorrect response may have the light "on" or be a different color such as red, for example.

In one embodiment, electronic device 111-113 may also include volume control 120-122 (respectively). For example, electronic device 111 may use volume control 120 to measure the background noise of the room with microphone 117 and adjust the amplitude of the sonic signal generated from speaker 114 accordingly. Also, electronic device 112 may use volume control 121 to measure the strength of the sonic signals received from electronic device 111 and adjust the amplitude of the sonic signal generated by speaker 115 accordingly. The information regarding the received sonic signal strength at microphone 118 may be sent via a sonic transmission back to electronic device 111 for volume adjustment of electronic device 111. Also, electronic device 113 may use volume control 122 to measure the strength of the sonic signal emanating from speaker 116 using microphone 119 and readjusting the amplitude of the sonic signal generated by speaker 116. Automatically controlling the strength (amplitude) of the sonic signal may help to maintain a signal which may be received reliably.

Volume adjustment may be necessary for transmission over varying distances. The sonic transmission may be operated across distances greater than 25 feet. However, the required volume of the sonic signal for large distances may be loud and perceptible to users at closer distances. With volume adjustment the strength of the sonic signal may be adapted to the environment. A stronger sonic signal may be generated for lengthy transmissions and/or noisy environments. Adjustments may be made to the audible signal for separation distances less than about six feet that are barely or not at all perceptible to the human ear.

Figure 2A:
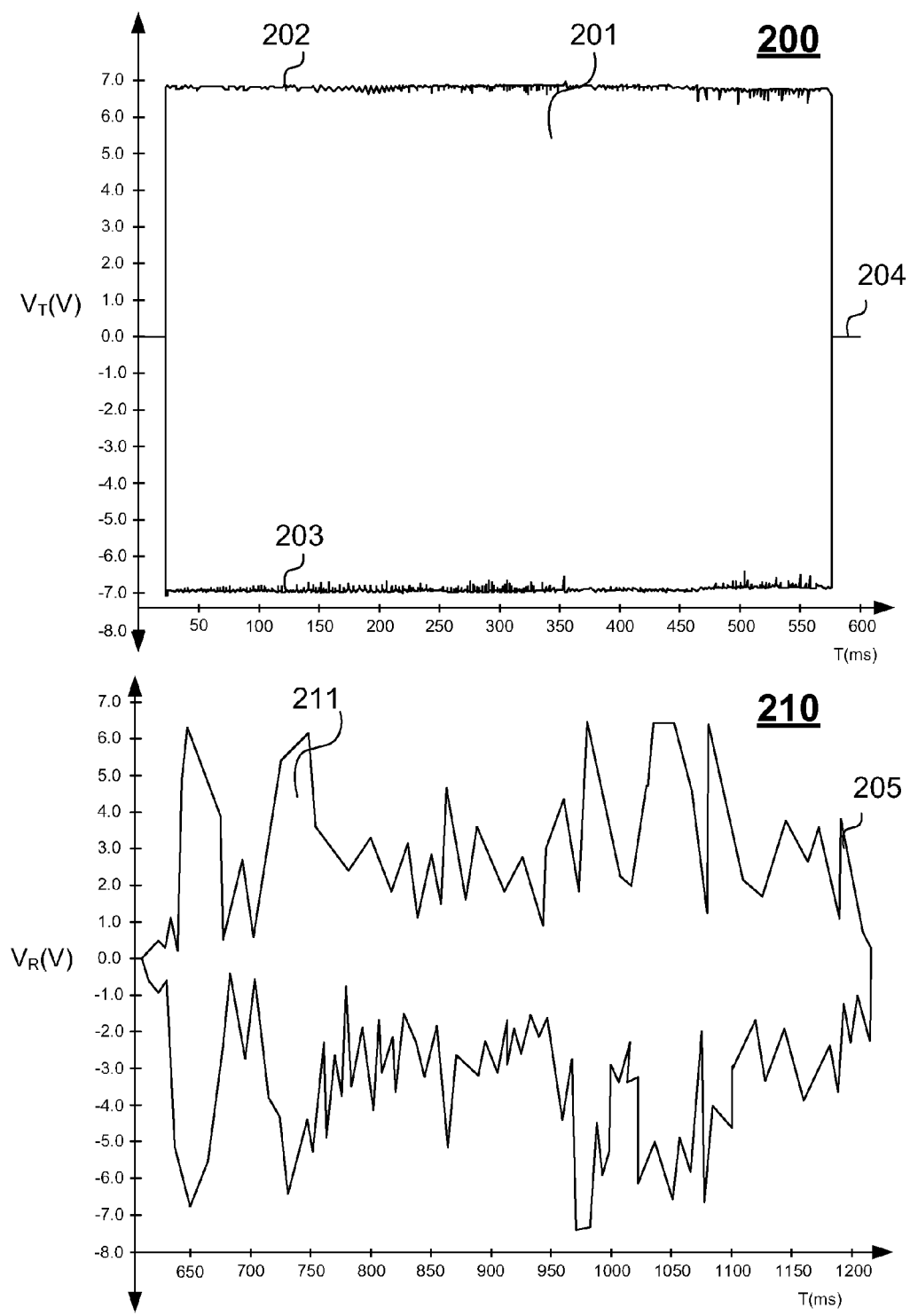
FIG. 2A illustrates a graph of an amplitude characteristic of a transmitted signal and a graph of an amplitude characteristic of a received signal.

FIG. 2A illustrates a graph 200 of the envelope of a transmitted signal and a graph 210 of the envelope of a received signal. The transmitted signal is provided to the speaker on an electronics board and the received signal is a signal provided after reception using a microphone on a second electronics board. Graph 200 includes an envelope 201 illustrating the amplitude range of the transmitted signal. The envelope 201 includes a line indicating the high 202 and low 203 of the signal. The signal, in this example, includes a sequence of tones that have approximately the same amplitude. The transmission of the signal stops when the amplitude decreases at location 204.

Graph 210 includes an envelope 211 illustrating the amplitude range of the received signal. Envelope 211 corresponds to envelope 201 of the transmitted waveform. The amplitude information of the transmitted signal may not be preserved (as shown). This may be due to the fact that neither the speaker nor the microphone oscillates in its fundamental mode at these frequencies. Also the interference between the direct transmission and room echoes may cause the amplitude of the received signal to vary considerably. Location 205 of envelope 211 corresponds to location 204 of graph 200. The envelope 205 has significant amplitude at location 205. This may be due to the room echoes which may pass some sonic energy which is delayed. This echoing effect may be a source of distortion contributing to the degrading of the direct transmission received.

Figure 2B:
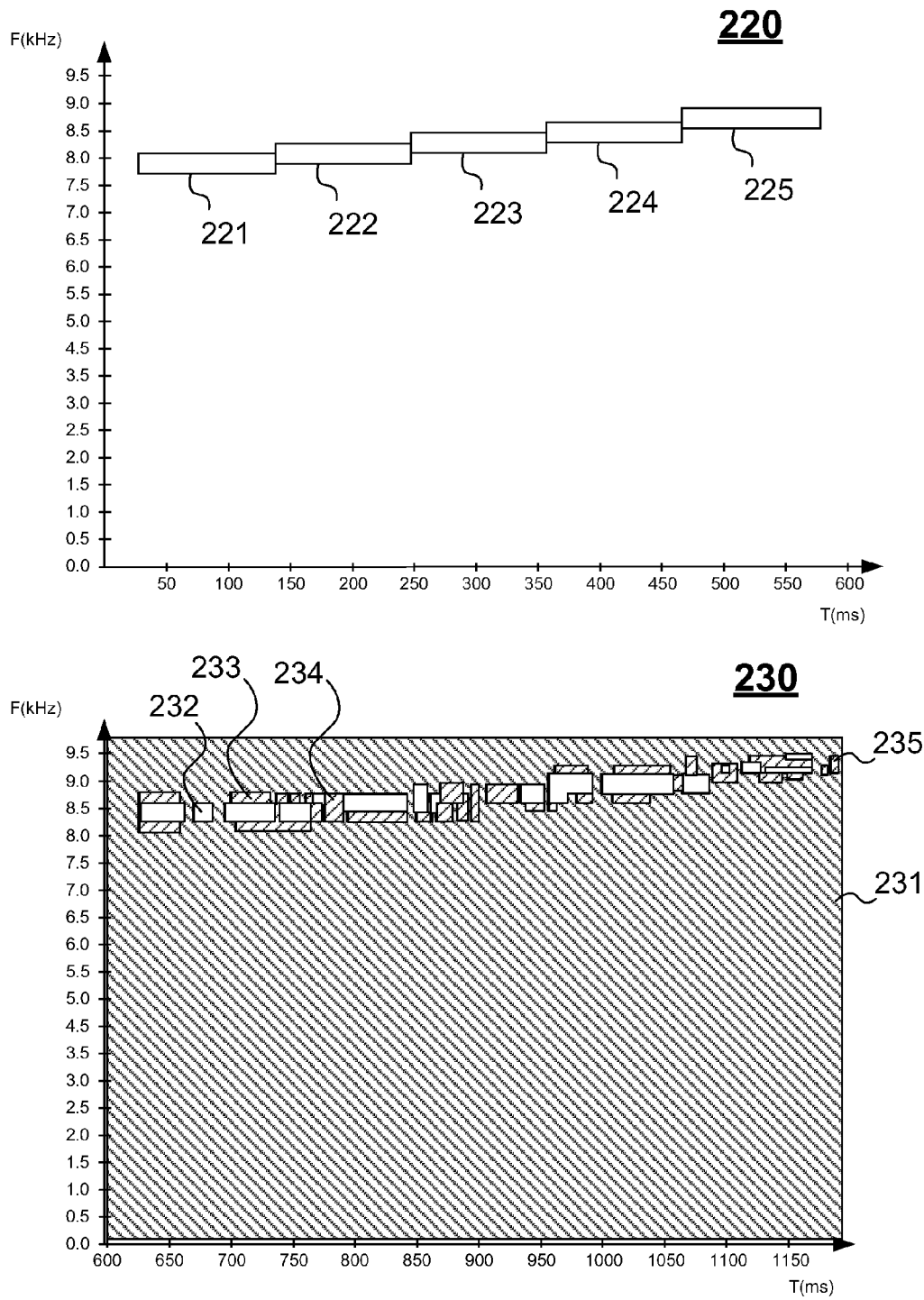
FIG. 2B illustrates a graph of a frequency characteristic of a transmitted signal and a graph of a frequency characteristic of a received signal.

FIG. 2B illustrates a graph 220 of a frequency characteristic of a transmitted signal and a graph 230 of a frequency characteristic of a received signal. Graph 220 corresponds to graph 200 of FIG. 2A. Graph 220 illustrates a signal made up of a crescendo of tones (221-225). Each tone (221-225) has a duration of approximately 100 ms. The tones (221-225) do not have any intervals between the tones.

Graph 230 corresponds to graph 210 of FIG. 2A. Graph 230 illustrates the frequency content changes over time for the received sonic signal. Area 231 represents background noise picked up by the microphone. The white boxes (e.g. box 232) show the signal portions with the highest energy. The hatched boxes (e.g. boxes 233 and 234) represent the signal portions which have energy less than the white boxes but more than the background noise of area 231. The hatched box 235 corresponds to signal at location 205 of FIG. 2A.

The received sonic signal may not be readily determined by the frequency characteristic of graph 230. The tones may be difficult to distinguish in graph 230 due to echoes and interference.

Figure 2C:
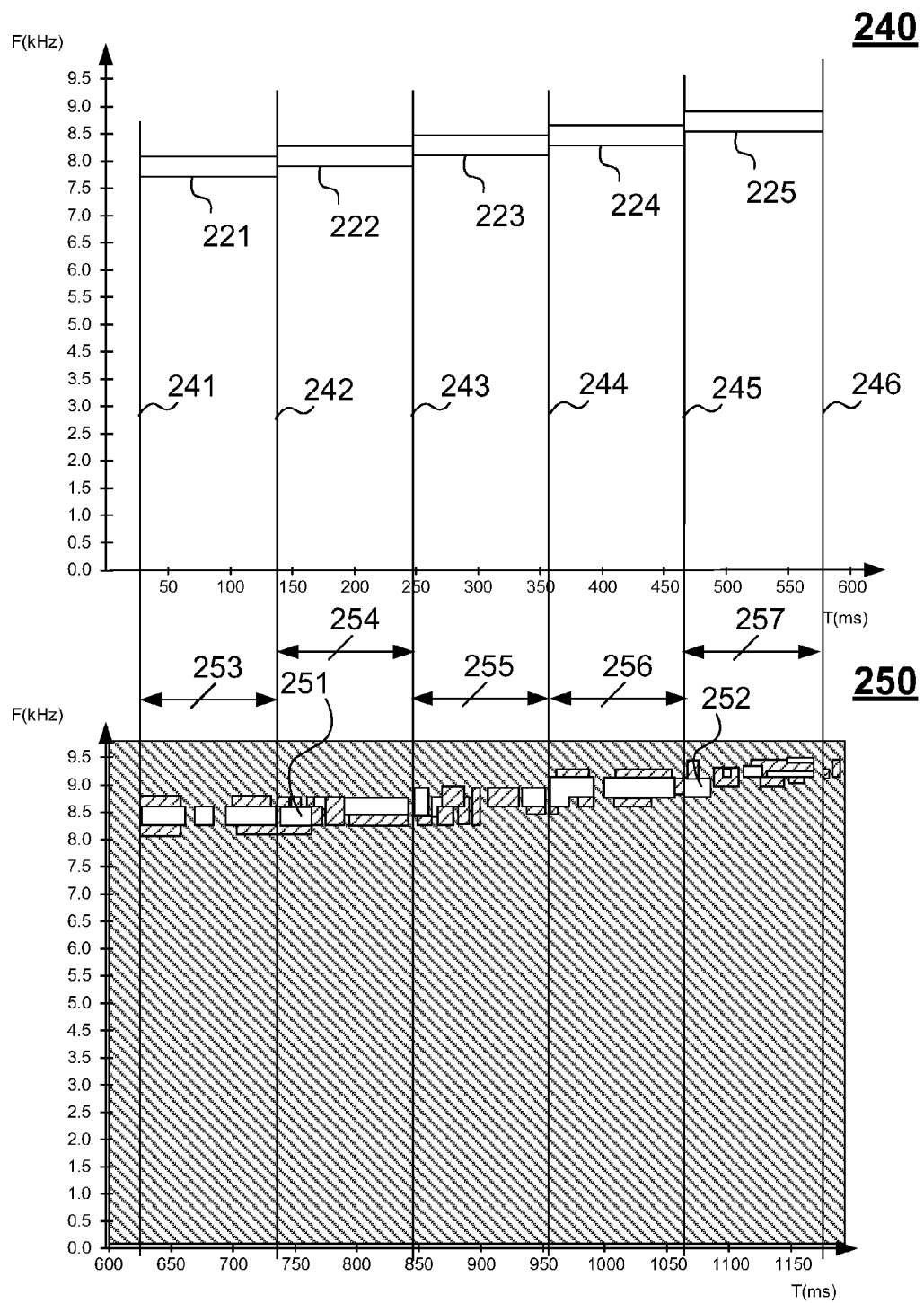
FIG. 2C illustrates graphs of the frequency characteristics of FIG. 2B with the individual tone durations indicated.

FIG. 2C illustrates graphs of the frequency characteristics of FIG. 2B with the individual tone durations indicated. Graph 240 is the same as graph 220 with the exception of timing markers 241-246. Graph 250 is the same as graph 230 with the exception of timing markers 241-246 and their associated timing sections 253-257. Having information regarding the timing of the tones allows for additional processing to help determine the tones for the frequency characteristic of graph 250. For example, section 253 corresponds to tone 221. With timing markers 241 and 242 the energy may be integrated and filtered with filters corresponding to the tones (221-225) more effectively. Statistically most of the energy may be in section 253 for tone 221. Synchronizing the received sonic signal may help to improve the results of an integration.

Some energy from tone 221 may cause echoes which may be received after the timing marker 242 which is the end of section 253. Box 251 is an example of echoes received after the direct transmission has ended. Box 252 is another example of echoes received. In this case, the energy of the echoes follows section 256. The energy in box 251 may cause the integration of section 254 to be skewed toward having enough frequency energy in the range of tone 221, that it may be misread. The example of box 252 provides an even worse case for misrepresenting section 257 as corresponding to tone 224 because the energy in the range of tone 225 is very weak. Separating the tones may allow for less interference between adjacent tones in the sequence of tones (221-225).

Figure 3:
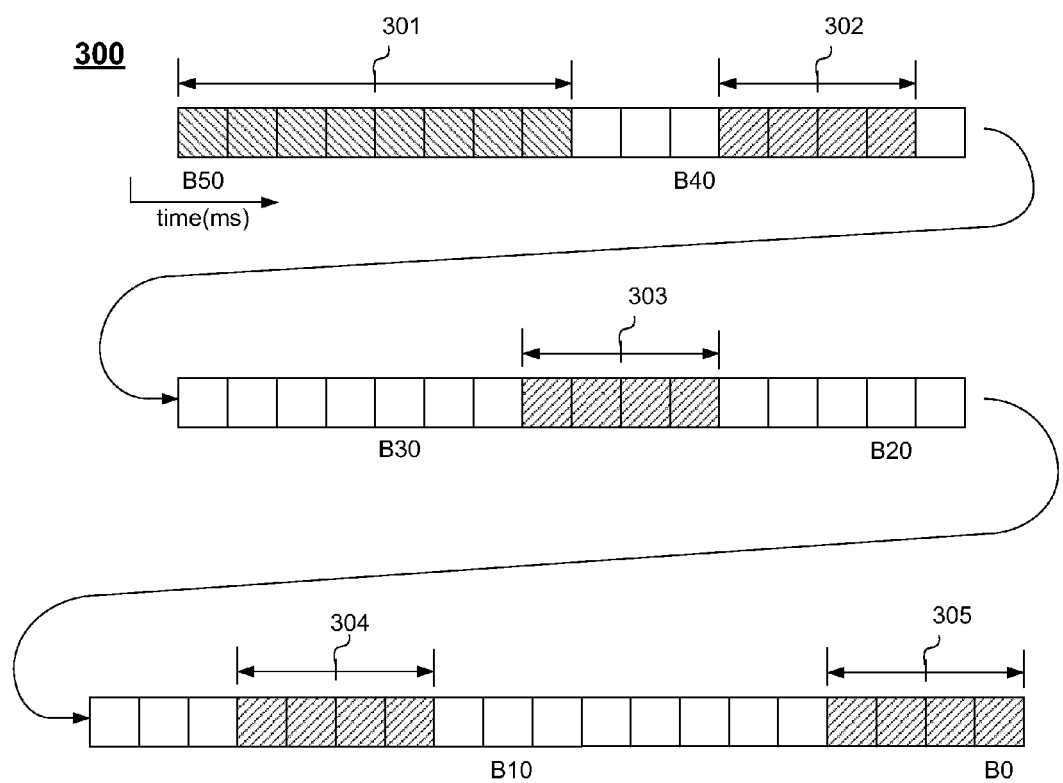
FIG. 3 illustrates a representation of a transmission of a sequence of tones according to one embodiment of the present invention.

FIG. 3 illustrates a representation of a transmission 300 of a sequence of sonic tones according to one embodiment of the present invention. The sequence of sonic tones may represent a code or a command. Transmission 300 is broken into blocks (B0, B1, B2, ..., B50). Block B50 is transmitted first and then B49 and so on. Blocks are approximately 13.73 ms in this embodiment but may vary according to the application. Each block may contain one of 5 tones or no signal at all in this embodiment.

Each tone transmitted is approximately 55 ms long (4 blocks). Block groups 302-305 are examples of the time frame when tones may be transmitted. A first digit may be transmitted during block group 302 (i.e. B39-B36). A second digit may be transmitted during block group 303 (i.e. B27-B24). A third digit may be transmitted during block group 304 (i.e. B15-B12). A fourth digit may be transmitted during block group 305 (i.e. B3-B0). The empty blocks are the time when no tone signal is transmitted. The timed intervals between the transmission of the tones may keep sequential tones from interfering with each other. Block group 301 (i.e. B50-B43) is also a group of blocks in which no tone signal is transmitted. Block group 301 may be utilized to determine the noise value of the transmission. The transmission containing tone signals (B39-B0) lasts for 40 blocks or approximately 550 ms. The empty blocks B4-B11, B16-B23, and B28-B35 may serve to extend the time of the transmission to 550 ms. Noise sources don't usually last as long as 550 ms. The timing may be modified to reduce the time between the block groups 302-305 if the noise characteristics differ in the user's environment.

In this embodiment the first digit (block group 302) is a synchronization tone which is transmitted every transmission. The second (block group 303), third (block group 304), and fourth (block group 305) digit may be any one of 4 other tones. Example tones are tabulated below.

TABLE 1

Example Tones

| Tone | frequency |
| --- | --- |
| 1 | 7575 Hz |
| 2 | 7800 Hz |
| 3 | 7975 Hz |
| 4 | 8170 Hz |
| 5 | 8400 Hz |

For audible tones to be transmitted by conventional speakers and received by conventional microphones they must occur at frequencies below about 10,000 Hz. The lower the frequency, the more audible the sonic transmissions are to a human listener and the more distracting they are. For this reason, this embodiment uses tones around 8 kHz. Frequencies around 8 kHz may be less perceptible to a listener when embedded in speech, in music or other sound effects.

In this embodiment, tone 1 (the synchronization tone) is always located in block group 302 which is designated as digit 1. Another criterion for transmission for this embodiment is that no tone is repeated. The allowable combinations of tones for the 4 digits in this embodiment are tabulated below.

TABLE 2

Example of Allowable Combinations

| Symbol | Combination |
| --- | --- |
| S0 | 1234 |
| S1 | 1325 |
| S2 | 1452 |
| S3 | 1543 |
| S4 | 1245 |
| S5 | 1342 |
| S6 | 1423 |
| S7 | 1524 |
| S8 | 1253 |
| S9 | 1354 |
| S10 | 1435 |
| S11 | 1532 |
| S12 | 1235 |
| S13 | 1324 |
| S14 | 1432 |
| S15 | 1523 |
| S16 | 1243 |
| S17 | 1345 |
| S18 | 1453 |
| S19 | 1542 |
| S20 | 1254 |
| S21 | 1352 |
| S22 | 1425 |
| S23 | 1534 |

There are 24 possible sonic transmissions in this embodiment. In other embodiments where repetition of tones is allowed but not on adjacent digits, there are 64 combinations. If a sixth tone frequency is allowed, 125 possible sonic transmissions are possible. Additionally, if there are five digits in a sonic transmission instead of four, the number of sonic transmissions possible is 625. If multiple tones at a single time are allowed the number of possible sonic transmissions is huge.

The shaded boxes (e.g. block groups 301-305) represent 24 blocks of data. If the entire transmission takes approximately 550 ms, then the data rate is 8 bits per second.

Figure 4:
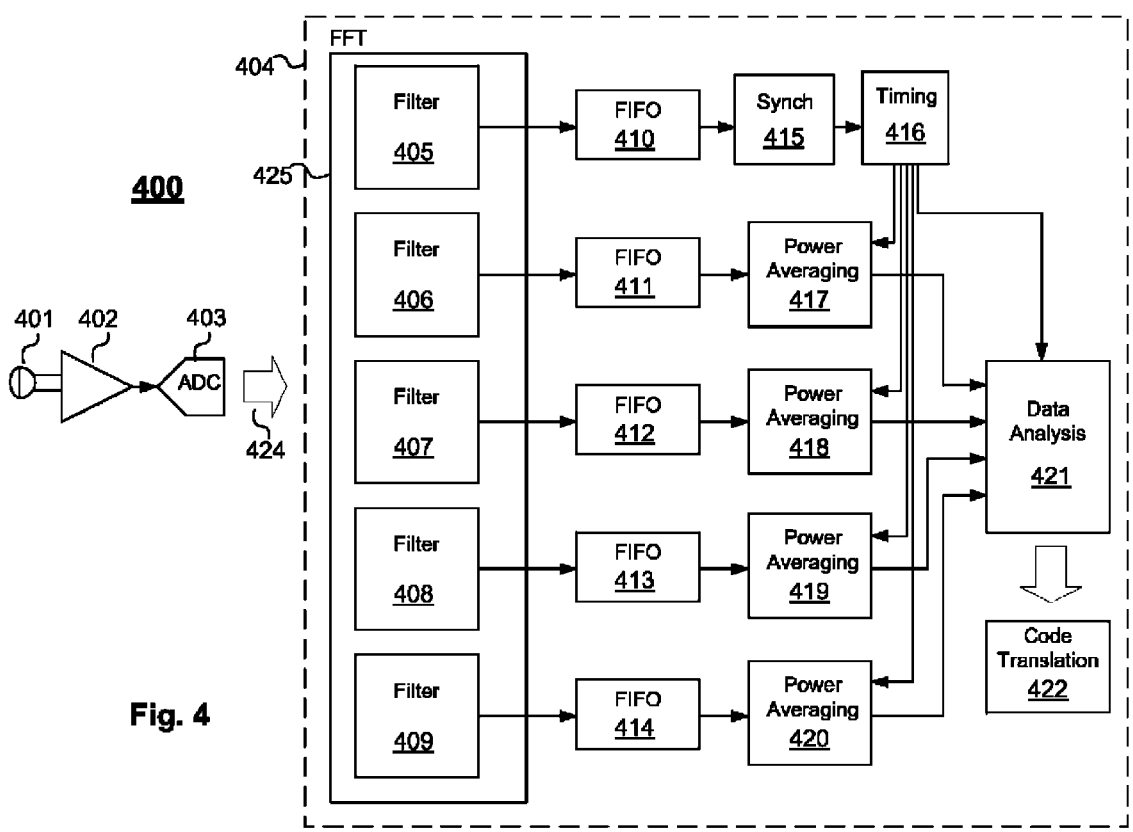
FIG. 4 illustrates a wireless receiver system according to one embodiment of the present invention.

FIG. 4 illustrates a wireless receiver system 400 according to one embodiment of the present invention. System 400 includes microphone 401, amplifier circuit 402, analog to digital converter 403, and digital signal processor (DSP) 404. Microphone 401 received a sonic signal and converts the signal to an electric signal using amplifier circuit 402. Amplifier 402 provides gain to the electrical signal and analog to digital converter (ADC) 403 converts the electrical signal to a digital representation 424. The digital representation 424 of the analog signal is then processed by DSP 404.

DSP 404 determines the sequence of sonic tones from the sonic signal received. DSP 404 receives the digital representation 424 of the sonic signal and performs a fast Fourier transform (illustrated at 425) on the digital representation 424 to form a set of values corresponding to a set of frequency bins. These frequency bins correspond to a band of frequency and are derived from the sampling frequency of ADC 403. Filters 405-409 illustrate the process. The frequency of each of the filters (505-409) corresponds to the sonic tones which may have been used to encode the sonic signal, when it was transmitted.

The data from each filter (405-409) is passed to a set of first-in-first-out (FIFO) registers 410-414. The data may processed sequentially in this manner. During the first portion of the transmission (i.e. block group 301 of FIG. 3) the filters 405-409 are passing power information to their corresponding FIFOs 410-414, and the information is being averaged by the corresponding processes 415 and 417-420. Each power averaging process 417-420 and synch process 415 may integrate the data presented by FIFOs 410-414. This data will be used as an estimation of the noise value at the respective frequencies (i.e. $N_1$, $N_2$, $N_3$, $N_4$, $N_5$) of the filters 405-409.

During the next portion of the transmission (i.e. block group 302 of FIG. 3) filter 405 may receive an increase of power values and pass that data to FIFO 410 and to synch process 415. The synch process 415 begins to integrate up the power and if the power exceeds 2 times the noise value previously measured (i.e. $N_1$), then the timing 416 is sent a signal to synch-up to the rest of the transmission.

With the timing 416, the remaining filters 406 to 409 begin processing the next portion of the transmission following a portion of silence (i.e. block group 303 of FIG. 3). Each filter 406-409 is processing the power for their associated frequency and the corresponding power averaging process 417-420 are integrating these powers over the approximate length of this portion of the transmission (i.e. block group 303 of FIG. 3) based on the timing 416. Twice the noise value previously measured corresponding to each filter (i.e. $2N_1$, $2N_2$, $2N_3$, $2N_4$, $2N_5$) is subtracted from the data. Next the data is sent to data analysis process 421. The data may be stored until the transmission completes. This data may relate to a first digit of a code combination of the transmission.

With the timing 416, the remaining filters 406 to 409 begin processing the next portion of the transmission following a portion of silence (i.e. block group 304 of FIG. 3). Each filter 406-409 is processing the power for their associated frequency and the corresponding power averaging process 417-420 are integrating these powers over the approximate length of this portion of the transmission (i.e. block group 304 of FIG. 3) based on the timing 416. Twice the noise value previously measured corresponding to each filter (i.e. $2N_1$, $2N_2$, $2N_3$, $2N_4$, $2N_5$) is subtracted from the data. Next the data is sent to data analysis process 421. The data may be stored until the transmission completes. This data may relate to a second digit of a code combination of the transmission.

With the timing 416, the remaining filters 406 to 409 begin processing the next portion of the transmission following a portion of silence (i.e. block group 305 of FIG. 3). Each filter 406-409 is processing the power for their associated frequency and the corresponding power averaging process 417-420 are integrating these powers over the approximate length of this portion of the transmission (i.e. block group 305 of FIG. 3) based on the timing 416. Twice the noise value previously measured corresponding to each filter (i.e. $2N_1$, $2N_2$, $2N_3$, $2N_4$, $2N_5$) is subtracted from the data. Next the data is sent to data analysis process 421. This data may relate to a third digit of a code combination of the transmission. This may be the last portion of the transmission and the filters 405-409, FIFOs 410-414, synch 415, the power averaging processes 417-421, and the timing may return to a state in which they are integrating for new noise values (i.e. $N_1$, $N_2$, $N_3$, $N_4$, $N_5$) once again and awaiting the next transmission.

In each reception of a transmission, the power of the signal associated with the synchronizing tone (i.e. block group 302) needs to be at least two times greater than the noise value measured (i.e. $S_1 - 2N_1 \geq 0$) in order for the remaining portions of the transmission to be processed. The table below illustrates the adjusted power values ($S_n - 2N_n$) for one transmission. "X" means the value does not matter. For example, in Block Group 302, only filter 1 "F1" matters and the rest of the filters are marked as "don't cares". Also after the synchronous tone passes the threshold, all the subsequent block groups (302-305 in FIG. 3) have an "X", a don't care, in the "F1" column.

TABLE 3

Adjusted Power Values of an Example Transmission

| Block Group | Digit | F1(mW) | F2(mW) | F3(mW) | F4(mW) | F5(mW) |
|---|---|---|---|---|---|---|
| 302 | 0 | 50 | X | X | X | X |
| 303 | 1 | X | <0 | 145 | 400 | 250 |
| 304 | 2 | X | 600 | 50 | <0 | 300 |
| 305 | 3 | X | 750 | 400 | <0 | <0 |

This example data, the criterion that no repeated digits are allowed, and the criterion that no combinations with a value of <0 are allowed results in a set of allowed combinations. The sum of the power of each of the digits in a combination is also calculated for the allowed combinations. For example, for symbol S2, corresponding to successive activations of filters 1, then 4, then 5, then 2, the power in filter 4 at the time of Block Group 303 is 400, the power in filter 5 at Block Group 304 is 300, and the power in filter 2 at Block Group 305 is 750. Thus the total power for S2 (ignoring the power associated with Block Group 302) is 1450. The allowed combinations are shown in bold in the table below.

TABLE 4

Example Power Sums of Allowed Combinations

| Symbol | Combination | Power Sum(mW) |
|---|---|---|
| S0 | 1234 | |
| S1 | 1325 | |

TABLE 4-continued

Example Power Sums of Allowed Combinations

| Symbol | Combination | Power Sum(mW) |
|---|---|---|
| S2 | 1452 | 1450 |
| S3 | 1543 | |
| S4 | 1245 | |
| S5 | 1342 | |
| S6 | 1423 | 1400 |
| S7 | 1524 | |
| S8 | 1253 | |
| S9 | 1354 | |
| S10 | 1435 | |
| S11 | 1532 | 1050 |
| S12 | 1235 | |
| S13 | 1324 | |
| S14 | 1432 | 1200 |
| S15 | 1523 | 1250 |
| S16 | 1243 | |
| S17 | 1345 | |
| S18 | 1453 | 1100 |
| S19 | 1542 | |
| S20 | 1254 | |
| S21 | 1352 | 1450 |
| S22 | 1425 | |
| S23 | 1534 | |

In this embodiment, the process would repeat until the sync process passes the threshold three times successfully. That means three sets of data are taken. Below is a table of example data. "d" indicates a combination which may be disqualified because a filter was less than or equal to zero, thereby disqualifying the combination from further consideration. The actual data analysis process 414 may automatically disqualify the combination as the data is being stored. These entries are included in the table below to demonstrate that a combination may be disqualified from the data of any accepted transmission. The table below illustrates the process of determining the combination corresponding to the sequence of sonic tones received.

TABLE 5

Example Probability Sets for Selected Combinations

| | Power Sums for selected Combinations (mW) | | | | | | |
|---|---|---|---|---|---|---|---|
| Transmission | 1352 | 1423 | 1432 | 1452 | 1453 | 1523 | 1532 |
| 1 | 1195 | 1400 | 1200 | 1450 | 1100 | 1250 | 1050 |
| 2 | 1400 | 1200 | 1600 | d | 700 | d | 900 |
| 3 | 1600 | 1000 | 1400 | 1800 | 400 | d | 700 |

From the table above, combination 1452 and 1523 are disqualified due to having an adjusted value less than or equal to zero. After disqualifying these combinations, the power sum in the third transmission with the largest value may be determined to be the combination corresponding to the received sequence of sonic tones. Therefore the combination "1352" is the determined value.

Note that without multiple transmissions a false determination may have occurred. For example, without disqualification in the second transmission, combination "1452" may have falsely been determined. Also note that only in the third transmission does the combination "1352" have the most average power.

Embodiments of the invention may have a false trigger rate of less than once per hour in a noisy environment and a success rate of greater than 99% in a noisy environment if the transmitter and receiver are within range of each other.

Figure 5:
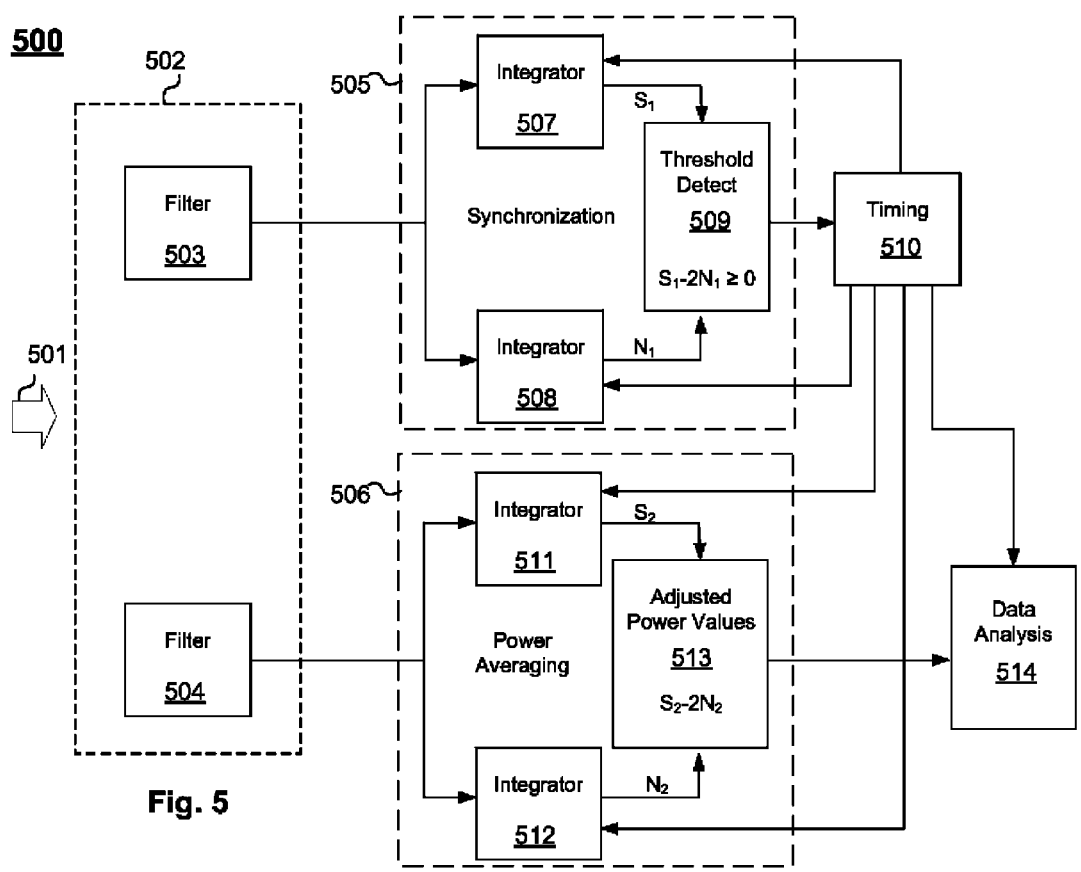
FIG. 5 illustrates a portion of a wireless receiver system showing synchronization and power averaging processes according to one embodiment of the present invention.

FIG. 5 illustrates a portion of a wireless receiver system 500 showing synchronization 505 and power averaging processes 506 according to one embodiment of the present invention. System 500 includes FFT process 502, synchronization process 505, power averaging process 506, timing process 510, and data analysis process 514. Synchronization process 505, power averaging process 506, and data analysis process 514 may work from a pipeline of data such that time segments may be processed before and after a synchronization event occurs.

A digital representation of a sonic signal 501 is presented to FFT process 502. FFT process includes filter 503 and filter 504. Filter 503 has a frequency which passes 7575 Hz which is designated as tone 1 (the synchronizing tone). Filter 504 has a frequency of 7800 Hz which is designated as tone 2. Not illustrated are blocks identical to filter 504 and block 506 for the remaining frequencies, 7975, 8170, and 8400 Hz.

Timing process 510 may have both integrator process 508 and integrator process 512 integrating over 8 blocks of time (e.g. block group 301 of FIG. 3). Integrator process 507 may be integrating over a shorter period such as 4 blocks of time (e.g. block group 302 of FIG. 3). Integrator process 507 will respond much faster to changes in the data. The output of integrator process 508 is a value of the noise value $N_1$ corresponding to the noise content which is approximately at 7575 Hz. The output of integrator process 512 is a value of the noise value $N_2$ corresponding to the noise content which is approximately at 7800 Hz. The output of integrator process 507 is a value of the signal value $S_1$ corresponding to tone 1 which is approximately at 7575 Hz.

When tone 1 at 7575 Hz is received it begins to increase the value of $S_1$. When $S_1$ exceeds $2N_1$ the synchronization process signals the timing process 510 to begin timing the transmission. Timing process 510 may notify the data analysis process 514 whenever a synchronizing signal has been detected.

Timing process 510 may send timing markers to integrator process 512 so that a value of $N_2$ may be calculated based on the synchronized 8 blocks of data (e.g. block group 301 of FIG. 3). Timing process 510 may also reset the integrator process 511 to begin and end integration based on the 4 blocks of data coming that will represent a first tone (e.g. block group 302 of FIG. 3) of the sequence of tones to be read. An average value $S_1$ will be determined from the integration and twice the average noise value will be subtracted from that value (i.e. $S_1-2N_1$). The result will be sent to the data analysis process 514.

Timing process 510 will set the start and stop times for integrator process 511 to integrate and average the values of $S_1$ for the other block groups as well (i.e. block group 303-305), subtract twice the noise value (i.e. $S_1-2N_1$), and send the data to the data analysis process 514. After the entire transmission data has been received the timing may set the integrators back to the original state in which the noise data is being collected and the synchronization process 505 senses for the arrival of the synchronization signal (tone 1). In an alternate embodiment the timing process 510 estimates the arrival of the next transmission.

Figure 6:
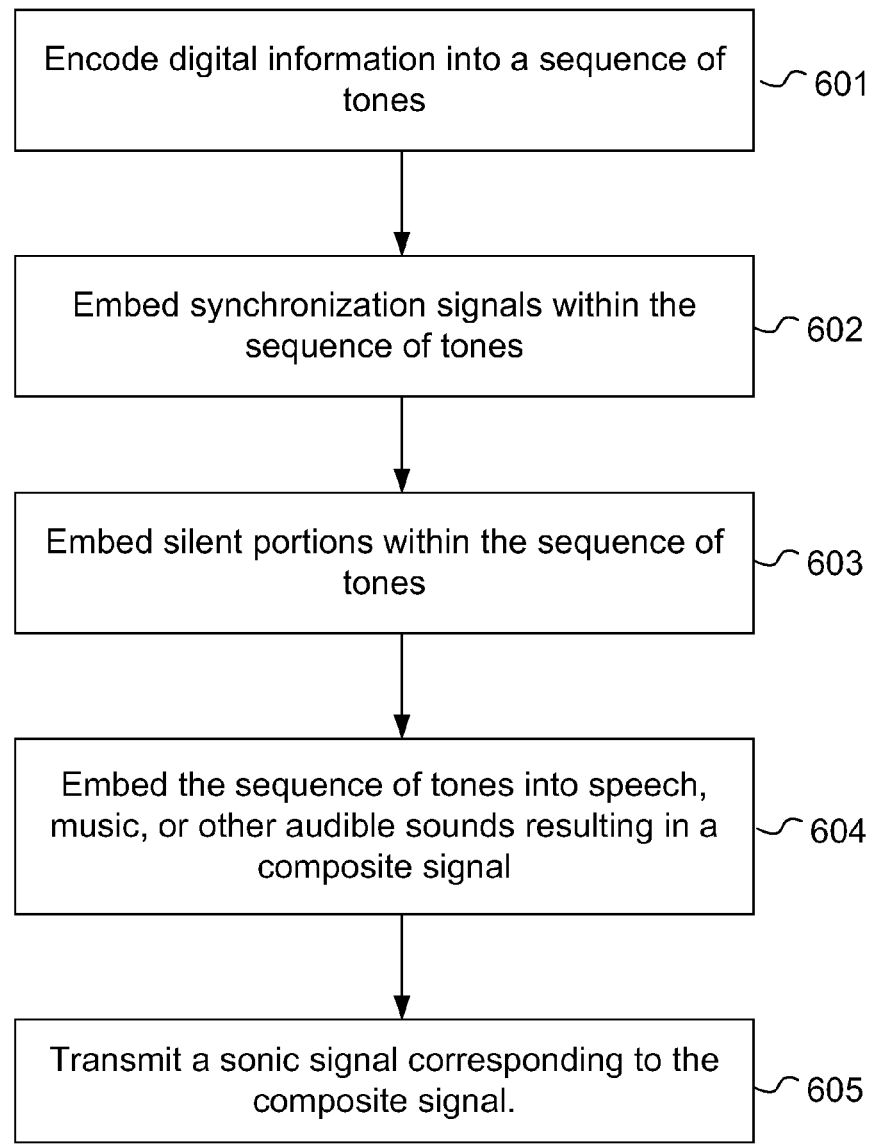
FIG. 6 illustrates a wireless communication method according to one embodiment of the present invention.

FIG. 6 illustrates a wireless communication method according to one embodiment of the present invention.

At 601, digital information is encoded into a sequence of tones. Each tone may have a frequency which corresponds to a number. For example 7575 Hz may correspond to the number "1" and 7800 Hz may correspond to "2". The sequence of the tones may represent a set of digits. For example the first tone may be a first digit, the second tone may be a second digit, and so on. The order of the digits may form a combination of numbers which may correspond to a code.

At 602, a synchronization signal is embedded within the sequence of tones. The synchronization signal may be a tone or a sequence of tones. A synchronization signal may accompany every transmission.

At 603, silent portions are embedded within the sequence of tones. The silent portions may separate the tones from each other to improve reception. One silent portion may define a portion of the transmission in which the receiver may determine the background noise values at designated frequencies corresponding to tones used to encode at 601.

At 604, the sequence of tones is embedded within speech, music, or other audible sounds. This result may be a composite signal. The composite signal may contain repetitions of the sequence of sonic tones in timed intervals of a cadence. The repetitions may be a burst of three equally spaced sequences. The strength of the sonic tones may be designed such that the sonic tones are not perceptible to the human ear.

At 605, a sonic signal corresponding to the composite signal is transmitted. The sonic signal may be transmitted with a conventional speaker. The sequence of sonic tones which are transmitted correspond to the sequence of tones and may be in the range of 7 kHz-10 kHz. In this range the sonic tones may be transmitted with a conventional speaker and may also be less perceptible to the human ear.

Figure 7:
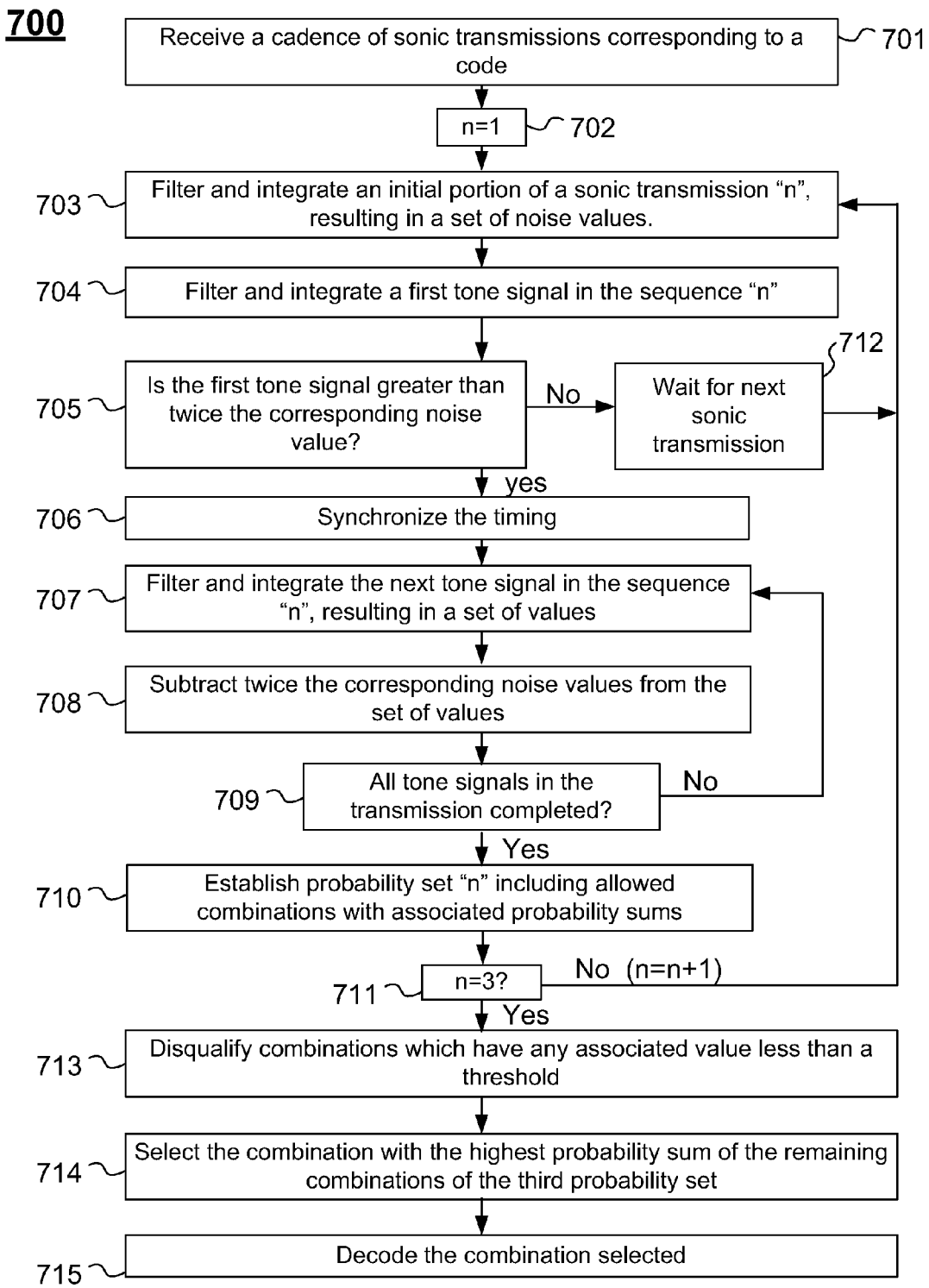
FIG. 7 illustrates a wireless communication method according to one embodiment of the present invention.

FIG. 7 illustrates a wireless communication method according to one embodiment of the present invention.

At 701, a cadence of sonic transmissions is received at a microphone. The cadence of sonic tones corresponds to a code.

At 702, a counter is set to one (i.e. n=1) which corresponds to the processing of the first transmission.

At 703, an initial portion of a sonic transmission is filtered and integrated. The filtering may be accomplished with digital signal processing if the received signal is first converted to a digital signal representation of the sonic transmission. The filtering may include several frequencies of interest and may result in a plurality of streams of data corresponding to the frequencies of interest. The streams of data may be integrated over a period (e.g. block group 301 of FIG. 3) to obtain a value of the noise for each frequency of interest (i.e. $N_{n1}$, $N_{n2}$, $N_{n3}$, $N_{n4}$, $N_{n5}$, where subscript "n" represents the transmission number).

At 704, a first tone signal is filtered and integrated. The first tone signal may be integrated over a smaller time period than the noise (i.e. block group 302 of FIG. 3). The filtering and integrating results in a value of the signal value $Sn_1$ corresponding to tone 1 (i.e. the first tone).

At 705, a determination of whether the signal value $S_{n1}$ is twice the noise value (i.e. $S_{n1}-2N_{n1}$, where subscript "n" represents the transmission number) is decided. This criterion may reduce the probability of an occurrence of a false trigger.

At 712, if the criterion of 705 does not occur the process will go back to 703. Returning to 703 may induce gathering updated data concerning the noise for each frequency of interest (i.e. $N_{n1}$, $N_{n2}$, $N_{n3}$, $N_{n4}$, $N_{n5}$, where subscript "n" represents the transmission number).

At 706, if the criterion of 705 (i.e. $S_{n1}-2N_{n1}$) is met than the timing is synchronized. With a pipeline of data in the system, the timing may be able to chose the data blocks in the correct fraction of time for calculating the noise values (e.g. $N_{n1}$, $N_{n2}$, $N_{n3}$, $N_{n4}$, $N_{n5}$, during block group 301 of FIG. 3). The timing may also be able to partition the data blocks which will be received into the appropriate data block (i.e. data block 302, 303, 304, and 305) so that a better integration of the data may be performed.

At 707, the next tone signal in the sequence is filtered and integrated. This may be performed with the timing of 706 and may result in a set of values (e.g. $S_{n1}$, $S_{n2}$, $S_{n3}$, $S_{n4}$, $S_{n4}$). At 708, twice the noise value is subtracted from the corresponding tone value of the set of tone values (e.g. $S_{n1}-2N_{n1}$, $S_{n2}-2N_{n2}$, $S_{n3}-2N_{n3}$, $S_{n4}-2N_{n4}$, $S_{n5}-2N_{n5}$). The calculations form a set of adjusted values.

At 709, if all the tone signals have not been received then loop back to 707 and begin filtering and integrating the next tone signal in time (e.g. block group 303, 304, and 305 of FIG. 3) until the end of the transmission.

At 710, a probability set "n" is established which include allowed combinations with their associated probability sums. For example, the table 5 above shows three rows of probability sets (i.e. transmission 1, 2, and 3). The sets may designate the sum (probability sum) of all the filters which have contributed to the combination.

At 711, the number of probability set is checked and if there isn't three sets yet, then loop back to 703 and begin filtering and integrating an initial portion of another transmission.

At 713, if the number of probability sets is already three, the combinations in any of the sets in which an adjusted value is less than or equal to a threshold may be disqualified. The threshold may be zero.

At 714, the combination with the highest probability sum of the remaining combinations of the third probability set is selected.

At 715, the selected combination is decoded. The decoding may result in a command, data, a request, or any combination herein.

Figure 8:
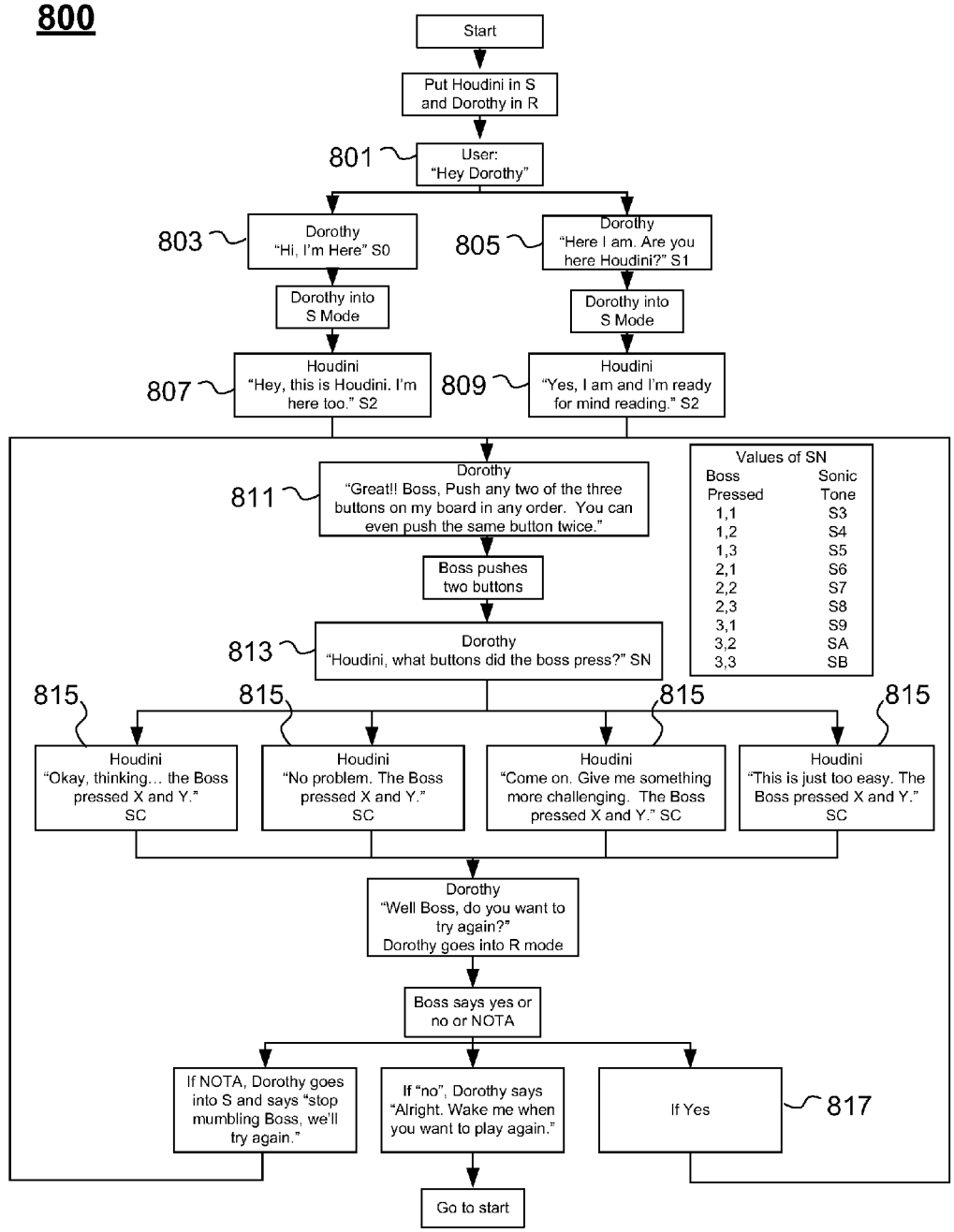
FIG. 8 illustrates an example game method according to one embodiment of the present invention.

FIG. 8 illustrates an example game method 800 according to one embodiment of the present invention. This is a game in which one character (Dorothy) asks the user (the Boss) to press any two buttons on her board. Then a second character (Houdini), who is remote from this activity, announces which buttons were pressed. The activity begins when the Boss says "Hey Dorothy" 801, which is recognized by a speech recognition system on the Dorothy board. Then Dorothy randomly says either "Hi, I'm here" 803, or "Here I am." Are you here, Houdini?" 805. The sonic transmission, S0, is embedded in the first message, and it is received by the Houdini board which causes it to reply "Hey, this is Houdini. I'm here too." 807. The sonic transmission, S1, is embedded in Dorothy's second message, which causes the Houdini board to synthesize "Yes I am, and I am ready for mind reading." 809. The sonic transmission, S2, is embedded in both Houdini messages so the Dorothy board receives the same sonic transmission, S2, in either case. This, in turn, causes the Dorothy board to synthesize "Great. Boss, push any two of the three buttons on my board in any order. You can even push the same button twice." 811. After this, the Boss pushes any two buttons on the Dorothy board, and the Dorothy board says, "Houdini, what buttons did the Boss press?" 813. Embedded in this message is one of sonic transmissions S3 through SB, depending on which buttons the Boss actually pressed. The Houdini board receives the appropriate sonic transmission and announces which buttons the Boss pressed by speaking one of four randomly selected phrases 815. The game can then be repeated if the Boss responds "Yes" to the question of whether the Boss wishes to play again, which response is recognized by the speech recognizer on the Dorothy board 817.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising: receiving a sonic signal at an electronic device using a microphone, the sonic signal including a sequence of sonic tones, the receiving resulting in a received sonic signal; and determining, by the electronic device, the sequence of sonic tones from the received sonic signal, thereby enabling wireless communication between the electronic device and another device, wherein each sonic tone in the sequence of sonic tones has a predefined duration, wherein the sequence of sonic tones includes a predefined silent interval between each successive sonic tone, and wherein the determining comprises analyzing the sequence of sonic tones at times that are based on the predefined durations and the predefined silent intervals.

2. The method of claim 1 further comprising filtering the received sonic signal according to a set of frequency bands corresponding to the sonic tones of the sequence of sonic tones, the filtering resulting in a plurality of tone signals corresponding to the sonic tones.

3. The method of claim 2 further comprising temporally synchronizing the tone signals corresponding to the sonic signal,
wherein the synchronizing utilizes a synchronizing signal embedded within the sequence of sonic tones.

4. The method of claim 3 wherein the synchronizing signal is one of the tone signals.

5. A method of claim 3 further comprising integrating the tone signals over a known receiving time based on the predefined durations and the predefined silent intervals.

6. A method of claim 5 further comprising removing noise elements from at least one tone signal by using the predefined silent intervals in the sequence of sonic tones.

7. A method of claim 5 wherein the determining includes the use of probability sets,
wherein the probability sets include sums corresponding to allowed tone combinations.

8. A method of claim 7 wherein the synchronizing signal synchronizes a transmission having the synchronizing signal,
wherein the receiving utilizes a pipeline of data which is evaluated after the synchronization signal has been detected.

9. A method of claim 8 wherein the allowed tone combinations do not include identical adjacent tones in the sequence of sonic tones.

10. A method of claim 5 wherein the determining includes disqualifying combinations having a tone signal with a power less than a threshold.

11. The method of claim 1 wherein each sonic tone in the sequence of sonic tones corresponds to a frequency band selected from a plurality of predefined frequency bands, and wherein the determining further comprises, for each frequency band in the plurality of predefined frequency bands:
   determining a power level of background noise for the frequency band; and
   determining whether a sonic tone corresponding to the frequency band has been received based on whether a power level of a signal received within the frequency band exceeds the power level of background noise for the frequency band by a predetermined amount.

12. A method comprising: encoding, by a first electronic device, digital information corresponding to a command into a sequence of sonic tones; and transmitting, by the first electronic device, a cadence of sonic signals corresponding to the sequence of sonic tones from a speaker coupled to the first electronic device, thereby enabling wireless communication between the first electronic device and a second electronic device, wherein each sonic signal has a predefined duration, and wherein the transmitting comprises transmitting the cadence of sonic signals at timed intervals with a predefined silent portion between each successive sonic signal.

13. The method of claim 12 wherein no more than a single sonic tone is transmitted at any time.

14. The method of claim 12 further comprising embedding synchronization signals within the sequence of sonic tones.

15. The method of claim 12 wherein the sequence of sonic tones carries redundant information.

16. The method of claim 15 wherein the sequence of sonic tones does not include adjacent tones having the same frequencies.

17. The method of claim 16 wherein each sonic tone of the sequence of sonic tones has a frequency from 7 kHz to 10 kHz.

18. The method of claim 15 further comprising embedding the sequence of sonic tones into speech or music such that the sequence of sonic tones is imperceptible to the human ear.

19. The method of claim 15 further comprising:
   receiving the cadence of sonic signals at a microphone coupled to a second electronic device;
   synchronizing the received sonic signals using the synchronization signals; and
   determining a sequence of frequencies corresponding to the sequence of sonic tones corresponding to the received sonic signals,
   wherein the silent portions, the cadence of sonic signals, the redundant information, the timed intervals, and the synchronizing are utilized to extract information corresponding to the command.

20. A non-transitory computer-readable medium having stored thereon program code executable by a computer system, the program code comprising: code that causes the computer system to receive digital information corresponding to a command encoded as a sequence of sonic tones; and code that causes the computer system to transmit a cadence of sonic signals corresponding to the sequence of sonic tones from a speaker coupled to the computer system, thereby enabling wireless communication between the computer system and another device, wherein each sonic signal has a predefined duration, and wherein the transmitting comprises transmitting the cadence of sonic signals at timed intervals with a predefined silent portion between each successive sonic signal.

* * * * *